Jan. 19, 1932.  J. B. GLOWACKI  1,841,727
FIXTURE SUPPORT AND CANOPY HOLDER
Filed Feb. 3, 1930   2 Sheets-Sheet 1
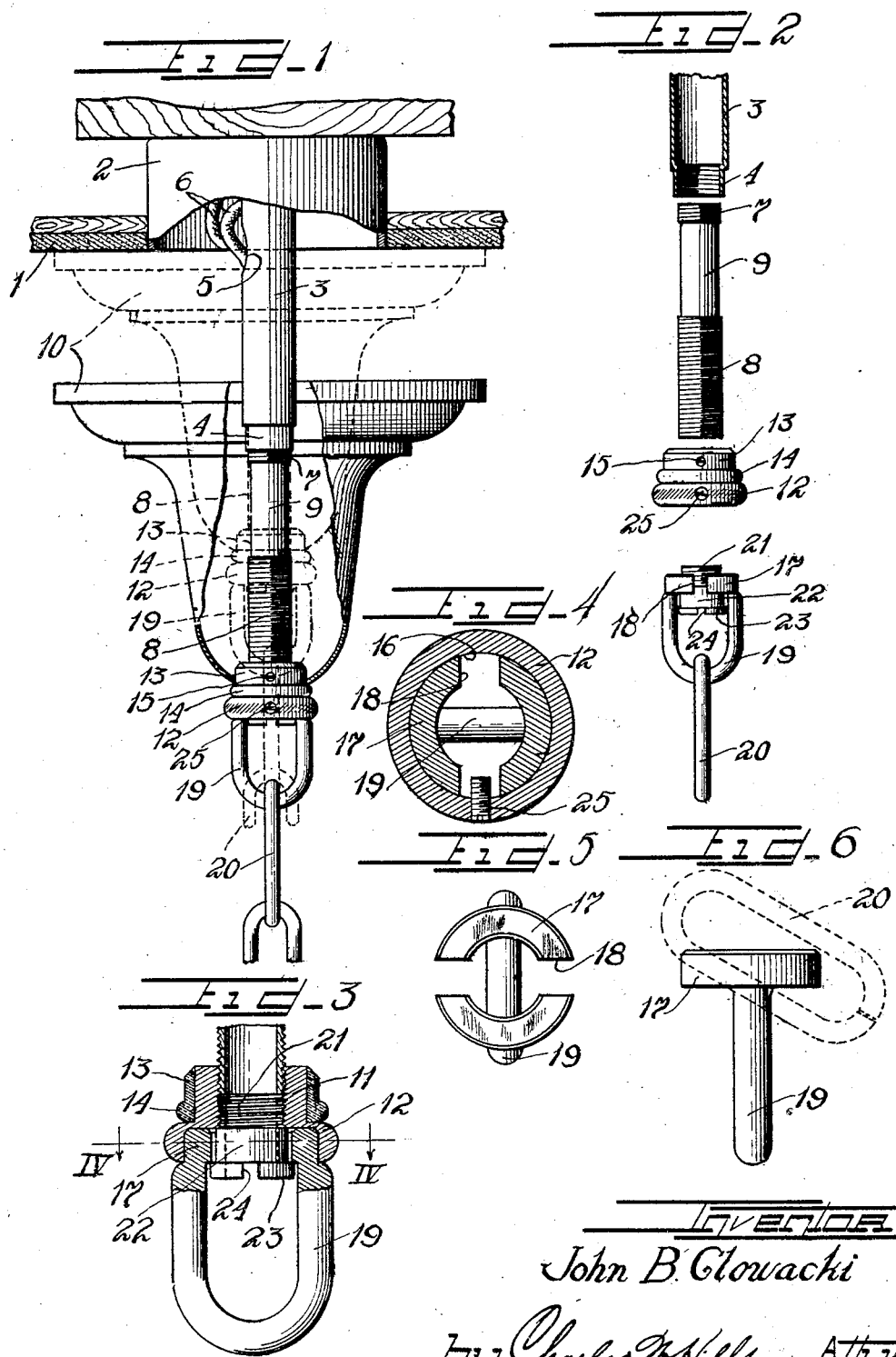
Inventor
John B. Glowacki
by Charles M. Wills Attys

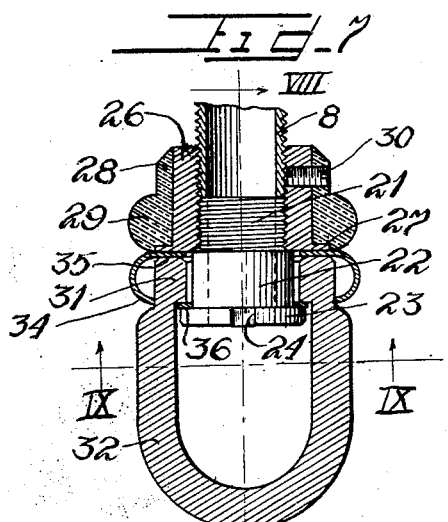
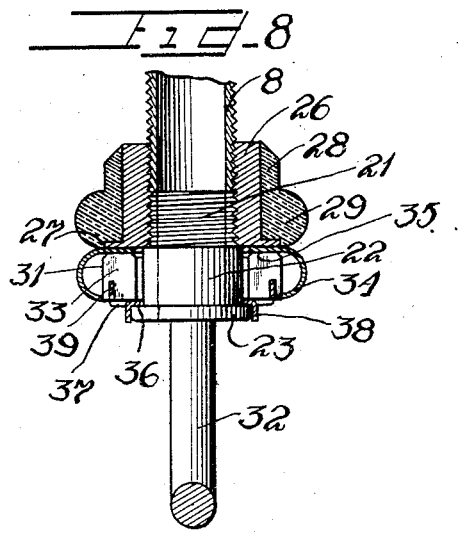
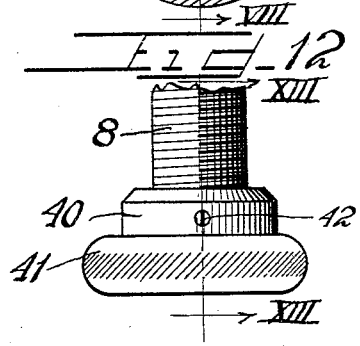
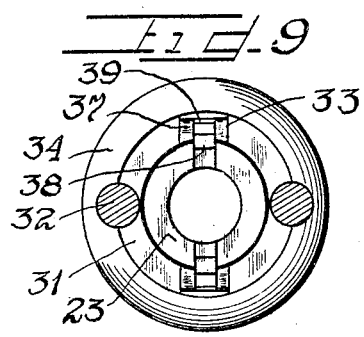
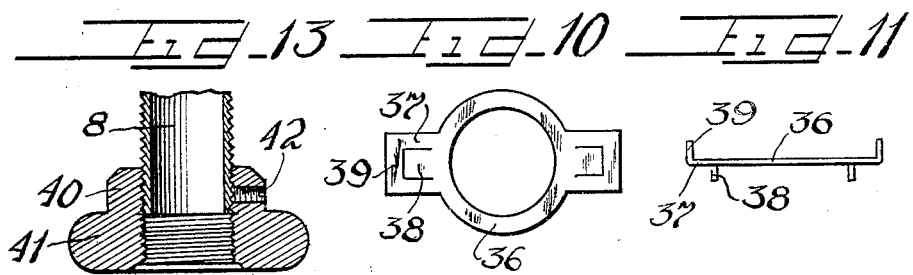

Patented Jan. 19, 1932

1,841,727

UNITED STATES PATENT OFFICE

JOHN B. GLOWACKI, OF CHICAGO, ILLINOIS

FIXTURE SUPPORT AND CANOPY HOLDER

Application filed February 3, 1930. Serial No. 425,410.

This invention relates to an improved fixture support and canopy holder of improved novel construction embodying a fixture stem having an intermittently threaded stem screw associated therewith to facilitate rapid mounting of a fixture. The stem screw has a split fixture supporting loop of either the insulation or non-insulation type connected with the lower end of the stem screw and provided with improved locking means whereby the rotatable split loop fixture supporting member may be conveniently locked against rotation after the stem screw has been engaged in the stem the required distance to position the canopy against the ceiling with the fixture properly supported in position by the fixture support.

It is an object of this invention to provide an improved fixture support and canopy holder of simplified construction wherein a fixture stem has removably associated therewith an intermittently threaded stem screw, on the lower end of which an initially rotatable split fixture-supporting loop mechanism is engaged and is adapted to be locked against rotation after a fixture has been properly supported in place.

It is also an object of this invention to provide an improved fixture support and canopy holder wherein a fixture stem has a sectionally threaded screw associated therewith to facilitate rapid hanging of a fixture.

It is a further object of this invention to provide an improved fixture support and canopy holder wherein a fixture supporting stem and split fixture supporting loop unit are connected by means of a stem screw constructed with an intermediate section free from screw threads to facilitate the rapid mounting of a canopy and a fixture associated with the improved fixture support.

It is furthermore an object of this invention to provide an improved type of fixture support wherein an adjustable stem device has a canopy support and a split fixture-supporting loop unit connected therewith and having locking means associated with the supporting loop to hold the same against rotation with respect to the adjustable stem.

Another object of this invention is to provide an adjustable fixture stem with a canopy support constructed with a normally rotatable split fixture-supporting unit having locking means associated therewith for the purpose of locking the split unit against rotation with respect to the adjustable stem after a fixture has been mounted in position.

Still another object of the invention is to provide a canopy holder and fixture support having a split fixture-supporting loop rotatably associated therewith and adapted, after a fixture has been properly supported in place, to be locked against rotation by suitable locking means.

It is an important object of this invention to provide an improved combination fixture support and canopy holder of simplified construction arranged to permit rapid mounting of a fixture and a canopy and embracing a fixture-supporting stem screw having threaded and telescoping engagement with a fixture stem and carrying on the lower end thereof a canopy holder and a normally rotatable fixture-supporting unit which is of a split construction for the reception of a fixture-supporting chain link without necessitating opening of said chain link, with said split loop provided with locking means adapted for locking the split loop against rotation after a fixture has been properly supported in place.

Other and further important objects of this invention will be apparent from the disclosures in the specification and the accompanying drawings.

This invention (in a preferred form) is illustrated in the drawings and hereinafter more fully described.

On the drawings:

Figure 1 is a fragmentary elevational view of a ceiling outlet box mounted in a ceiling and having associated therewith an improved fixture support and canopy holder embodying the principles of this invention and illustrating the mounting operation in dotted lines.

Figure 2 is a disassembled elevational view of the improved fixture support and canopy holder illustrating a portion of the stem in section.

Figure 3 is a fragmentary sectional view of the lower portion of the fixture support and canopy holder with the stem screw partly broken away and showing the loop retaining nipple in elevation.

Figure 4 is a detail transverse section taken on line IV—IV of Figure 3.

Figure 5 is a top plan view of the split fixture-supporting loop.

Figure 6 is a side elevation of the split fixture-supporting loop illustrating a closed chain link in dotted lines to illustrate the method of inserting or engaging the link through the split portion of the loop.

Figure 7 is a fragmentary sectional view of the lower portion of a modified form of fixture support and canopy holder illustrating a separate lock ring for use with the split fixture-supporting loop and furthermore provided with a modified form of locking member for holding the split loop against rotation after a fixture is mounted in place.

Figure 8 is a fragmentary sectional view taken on line VIII—VIII of Figure 7.

Figure 9 is a sectional view taken on line IX—IX of Figure 7 and illustrating the locking fingers of the locking member bent over and seated in locking engagement with the retaining nipple of the split loop member.

Figure 10 is an enlarged developed plan view of the split loop locking member removed from the device.

Figure 11 is a side elevation of the locking member bent into form ready for engagement between the retaining nipple and the split ring member of the split loop.

Figure 12 is a fragmentary elevational view of the lower portion of another modified form of fixture support and canopy holder of the non-insulation type, with the split loop unit and retaining nipple omitted.

Figure 13 is a sectional view taken on line XIII—XIII of Figure 12.

As shown on the drawings:

The reference numeral 1 indicates a ceiling or wall having supported therein an outlet box 2 in which the upper end of an electric light fixture stem 3 is supported. Integrally formed on the lower end of the fixture stem 3 is an internally threaded sleeve or shank 4. The fixture stem 3 is provided with a hickey opening at 5 through which the fixture wires 6 are adapted to project to permit the same to be connected with the wires in the outlet box 2. Associated with the lower internally threaded shank end 4 of the fixture stem 3 is a stem screw unit comprising a small externally threaded upper screw section 7, a large externally threaded lower screw section 8 and a plain connecting section or smooth shaft section 9 which integrally connects the threaded sections 7 and 8, as clearly illustrated in Figure 2. Engaged over the fixture stem 3 and the fixture stem screw unit is a fixture canopy 10.

The upper threaded section 7 of the screw stem unit is normally threaded into the internally threaded sleeve 4 of the fixture stem 3, similar to the full line arrangement illustrated in Figure 1. Engaged on the lower end of the large screw section 8 of the screw stem is a canopy holder unit of the insulation type comprising an internally threaded metal sleeve or collar 11 having integrally formed on the lower end thereof an enlarged rounded bead head or ring 12 which is externally knurled to facilitate gripping of the same. Seated around the metal collar or sleeve 11 is an insulation sleeve 13 provided with an integral insulation rounded bead 14. The insulation bead 14 is positioned to seat upon the metal bead ring 12, as illustrated in Figure 3. Engaged through a threaded opening provided in the insulation sleeve 13 and in the metal collar 11 is a set-screw 15 for holding the canopy holder or support locked upon the lower end of the screw stem unit.

The base ring 12 of the canopy holder is hollowed out underneath to afford a pocket or recess 16 for rotatably receiving a ring or head 17 provided with a diametrical slot 18. Integrally formed on the split head 17 is a fixture-supporting loop or link 19. The split head 17 and the integral loop 19 forming a part thereof provide a split supporting unit adapted to permit a closed link 20 of a fixture-supporting chain to be passed downwardly through the slot 18, similar to the dotted line arrangement illustrated in Figure 6, to permit the closed chain link to be engaged on the split loop 19 without requiring opening of said link.

After the uppermost link of the chain 20 is engaged in the slotted supporting loop 19 as described, a longitudinally passaged externally threaded shank 21 of a retaining nipple or retaining member 22 is projected through the slotted head 17 and is threaded into the lower end of the holder sleeve or collar 11, as illustrated in Figure 3. The retaining nipple has the enlarged body portion 22 thereof smooth, or free from threads, to permit the split head 17 of the loop member to be rotatably supported on the nipple above a flange or head 23 having a diametric passage or slot 24 provided therein. The flange or head 23 of the nipple affords a seat or support for the split loop unit to hold the same rotatably engaged within the chambered base bead or ring 12 of the canopy holder unit.

The wires from the fixture supported on the lower end of the chain 20 are laced upwardly through the links of the chain and pass through the nipple and holder unit upwardly through the intermittently threaded screw stem and the supporting stem 3 so that the fixture is set and ready to be hung in place. With the canopy 10 resting on the insulation bead 14 of the insulation member 13, as illustrated in full lines in Figure 1, the supporting stem 3 is secured in the outlet box 2 and the wires leading from the hickey opening 5 are connected with the wires in said outlet box. In the position of the fixture support illustrated in full lines in Figure 1, it will be noted that the upper or reduced threaded section 7 of the screw stem is only partly threaded into the internally threaded shank 4 of the stem 3 in order to connect the various members and hold the canopy 10 in its lowered position to afford a space between the upper end of the canopy and the ceiling 1 to facilitate proper connection of the wires in the outlet box. With the wires 6 connected to the wires in the outlet box, the screw stem is rotated by means of the knurled bead 12 while the fixture-supporting split loop unit 19 is held against rotation to prevent twisting of the wires during the time that the screw stem is rotated. The screw stem is rotated until the reduced screw section 7 of the screw stem is threaded through the internally threaded shank 4 into a position permitting the plain section 9 of the screw stem to be slidably pushed upwardly through the threaded shank 4, thereby raising the entire fixture support, canopy and the fixture supported on the lower end of the chain 20. This provision of the plain section in the screw stem greatly facilitates mounting of the fixture and reduces the time required for engaging the screw stem with the stem 3. The screw stem is raised until the upper end of the canopy 10 is moved into contact with the ceiling 1, as illustrated in dotted lines in Figure 1, after which the screw stem is again rotated to cause the enlarged threaded section 8 thereof to thread through the internally threaded shank 4 of the stem 3 to hold the parts supported in position. The screw stem is threaded upwardly an amount sufficient to hold the canopy properly clamped in position between the ceiling 1 and the insulated bead 14 of the holder. After the fixture has been mounted in position by means of the improved fixture support and canopy holder, a lock screw 25 is threaded through a threaded passage provided in the holder bead 12 so that the inner end of the lock screw projects into the slot 18 provided in the head 17 of the split fixture supporting loop unit 19. The locking screw 25, when in the position illustrated in Figure 4, serves to hold the split fixture-supporting loop unit 17—19 locked against rotation within the recessed bead or head 12 of the canopy holder unit.

With the arrangement described, it will be noted that the canopy 10 is adapted to be seated and supported on the beaded insulation collar forming part of the head of the screw stem and is adapted to be raised and lowered with the raising and lowering of said screw stem with respect to the stem 3. The canopy is thus insulated from the fixture. The canopy holder or head of the screw stem also serves as a means for receiving the split fixture-supporting unit which normally is rotatable on the plain body section of the supporting or retaining nipple to permit the fixture and the wires to be held against rotation during the time that the screw stem is engaged in the stem 3 during an installation. The locking screw 25 is provided to lock the split fixture-supporting unit against rotation with respect to the screw stem after a fixture has been mounted in position.

Figures 7 to 11, inclusive, illustrate a modified form of fixture support and canopy holder provided with a modified form of locking device for the split loop unit. In this modified form of the fixture support and canopy holder, the stem and the intermittently threaded screw stem are identical to the showing in Figures 1 and 2, and only the lower portion of the screw stem is illustrated in Figures 7 and 8. The nipple mechanism for coupling the split loop unit with the canopy holder is also identical in construction with the nipple unit illustrated in Figure 3 of the drawings.

The modified form of canopy holder is in the form of a screw stem head comprising a metal sleeve or collar 26 which is internally threaded and is screwed upon the lower end of the lower or large screw section 8 of the screw stem. The lower end of the metal sleeve or collar 26 is provided with an integral flange 27. Engaged around the sleeve or collar 26 is an insulation sleeve or collar 28 having integrally formed on the lower end thereof a rounded insulation bead or rim 29 which affords a seat on which the lower end of a canopy is adapted to rest. The bottom of the insulation bead 29 is provided with a cut-out or recess in which the flange 27 is adapted to seat. Engaged through the insulation sleeve 28 and the inner metal sleeve 26 is a set-screw 30 which is adapted to be forced against the screw stem section 8, as illustrated in Figure 7, to hold the canopy holder locked in position against rotation with respect to the screw stem. The insulation covering 28—29, forming a part of the holder, serves to insulate the canopy from the fixture-supporting device.

For the purpose of supporting or connecting a fixture to the lower end of the screw stem, a split fixture-supporting unit is provided and comprises a split head or ring 31 having integrally connected therewith a loop or link 32. The loop 32 connects the two split segments of the loop head and holds the same in spaced relation to provide a slot 33 between the head segments.

When the split loop unit is disengaged from its support, a closed link of a fixture-supporting chain is adapted to be engaged through the slot 33, similar to the arrangement illustrated in Figure 6, after which the split loop is adapted to have a lock ring device engaged on the split head 31. The lock ring device comprises a rounded metal ring 34 having a flange ring 35 integrally formed on one side thereof and adapted to seat against the split head segments 31 to hold the lock ring in position. The locking ring 34, when engaged on the split head of the loop unit, serves to hold the split segments or portions of the head 31 against springing outwardly away from one another. With the lock ring engaged on the split head of the loop and with a fixture chain engaged on the split loop as described, the nipple or coupling for connecting the split loop with the canopy holder is engaged through the split head 31 and through the locking ring 34 engaged thereon so that the split loop unit is ready to be connected with the holder device on the lower end of the screw stem.

Before engaging the connecting nipple through the split head 31 of the loop unit, a latch or locking member is engaged over the body portion 22 of the nipple and seats upon the nipple flange or head 23 similar to the arrangement illustrated in Figures 7 and 8. The locking member comprises a flat metal ring 36 having integrally formed on opposite sides thereof a pair of diametrically opposite arms or flanges 37 having locking lugs or tongues 38 struck therefrom and normally bent downwardly at right angles, similar to the arrangement illustrated in Figure 11. The ends of the two arms 37 are bent upwardly at right angles to provide fingers or flanges 39. The lugs or flanges 39 are bent in a direction opposite to the lugs or tongues 38.

Before the coupling or nipple is engaged through the split head 31 of the loop unit, the locking member has the ring section 36 thereof engaged over the body portion 22 of the nipple, so that the lock ring 36 seats against the flange or head 23 of the nipple. The nipple, with the locking member engaged thereon, is now engaged through the split ring member 31, and a threaded shank 21 of the nipple is threaded into the lower threaded end of the holder inner metal sleeve 26. The nipple is threaded upwardly until the flange 35 of the lock ring 34 is clamped against the under surface of the flange 27 of the holder sleeve 26 while the lock ring 36 is clamped between the nipple head 23 and the lower surface of the split ring member 31, as illustrated in Figure 8, with the flanges or lugs 39 of the locking unit projecting upwardly into the slot 33 of the split head of the loop unit. The locking lugs or tongues 38 of the locking member project downwardly to the outside of the flange or head 23 of the nipple.

With the split connector loop connected with the holder on the lower end of the screw stem and with a fixture supported on the split loop 32 by means of a chain or other connecting medium, the stem 3, with the screw stem section 7 engaged in the threaded shank 4, is connected in the outlet box 2 similar to the arrangement illustrated in Figure 1, leaving a space between the upper end of the canopy and the ceiling 1, to permit the fixture wires to be connected with the wires in the outlet box. With the wires properly connected, the knurled holder bead 29 is rotated, together with the screw stem, until the threaded upper section 7 of the screw stem is threaded through the internally threaded shank 4 of the stem 3, after which the intermediate or smooth portion of the screw stem is projected upwardly into the stem 3 until the threaded section 8 is brought into engagement with the internally threaded shank 4 of the stem 3. The screw stem is again rotated to cause the threaded section 8 of the screw stem to be threaded upwardly into the stem 3, thereby gradually raising the fixture until the upper end of the canopy 10 is brought into contact with the ceiling 1, similar to the dotted line arrangement illustrated in Figure 1. During the mounting of the fixture by means of the stem 3 and the screw stem engaged therewith, the split loop 32 is held against rotation, so that the wires from the fixture are not twisted during the time that the screw stem is rotated and threaded into engagement with the stem 3. The lower section 8 of the screw stem is threaded into the lower internally threaded end of the stem 3 until the canopy is tightly clamped in position between the ceiling and the insulated bead or seat 29 forming part of the holder which is locked on the lower end of the threaded stem section 8 by means of the set-screw 30. After the fixture has been properly hung as described, the split loop unit which is rotatably supported on the body section 22 of the retaining nipple is locked in position against rotation with respect to said nipple by means of the locking lugs or tongues 38 which are bent inwardly from the position illustrated in Figure 8 to seat or project into the ends of the groove 24 provided in the head 23 of the nipple. This engagement of the locking lugs in the groove 24 of the nipple, together with the flanges or lugs 39 which project into the slot 33 of the split head of the loop unit, locks the split loop unit against rotation with respect to the nipple, the canopy holder and the threaded stem engaged in the fixture-supporting stem 3.

Figures 12 and 13 illustrate a non-insulation type of canopy holder adapted to be locked on the lower end of a fixture screw stem. The modified form of non-insulation canopy holder illustrated in Figures 12 and 13 is adapted to be used in combination with a split loop and lock ring of the type illustrated in Figures 7 and 8.

The modified form of non-insulation canopy holder comprises an internally threaded metal sleeve or collar 40 having integrally formed thereon a rounded collar or bead 41 which is externally knurled to facilitate gripping of the same to permit rotation of the screw stem on which the holder is adapted to be locked by means of a set-screw 42 engaged through a threaded aperture provided in the holder sleeve or collar 40, as illustrated in Figure 13. In this form of an all-metal holder, the canopy engaged on the stem is adapted to have the lower end thereof seated against the top flange or rim 41 of the holder. If desired, the all-metal canopy holder may have the lower beaded portion thereof provided with a recess similar to the showing in Figure 3 of the bead member 12 to permit the split head of a split loop unit to be rotatably engaged therein on a nipple corresponding to the assembly of parts illustrated in Figure 3.

While the various beads and lock rings have been described and illustrated as being of a rounded design, it will, of course, be understood that said beads and lock rings may have any desired configuration to correspond to the design of the fixture with which the improved fixture support and canopy holder is to be used.

It will, of course, be understood that various details of construction may be varied through a wide range without departing from the principles of this invention, and it is, therefore, not purposed to limit the patent granted hereon otherwise than necessitated by the scope of the appended claims.

I claim as my invention:

1. A fixture support and canopy holder comprising a fixture stem, a screw stem adjustably engaged therewith, a canopy holder locked on said screw stem and provided with a seat to support a fixture canopy, a split loop adapted to receive a closed fixture supporting member engaged therein, and a nipple projecting through the split loop and secured in the canopy holder.

2. A fixture support and canopy holder comprising a stem, a screw adjustably engaged therein, a canopy holder locked on the lower end of said screw, a nipple removably engaged with said canopy holder, a split loop member rotatably engaged on said nipple, and locking means for locking the split loop member against rotation with respect to the nipple.

3. A fixture support and canopy holder comprising a stem, an intermittently threaded screw adjustably engaged therewith, a canopy holder locked on the lower end of said screw, a nipple removably engaged in said holder, a split loop rotatably engaged on said nipple below said holder, and means for locking the split loop against rotation with respect to said nipple and said holder.

4. A fixture support and canopy holder comprising a fixture-supporting stem, a screw member adjustably engaged therein, a beaded canopy holder engaged on the lower end of said screw, means for locking the beaded canopy holder against rotation on said screw, a nipple removably engaged in said beaded canopy holder, a split loop unit rotatably supported on said nipple, and means for locking the split loop unit against rotation with respect to the nipple.

5. A fixture support and canopy holding device comprising a stem, a canopy holder locked on the lower end thereof, a split fixture-supporting loop unit, a nipple for coupling the split fixture-supporting loop unit with said canopy holder and a locking means adapted to be bent to engage in the loop unit and in said nipple to lock the loop unit and nipple together.

6. A fixture-supporting device of the class described comprising a stem, a split fixture-supporting unit, and a connector between said stem and said split fixture-supporting unit, said connector comprising threaded end sections connected by means of an intermediate plain section to facilitate interfitting engagement of the connector with said stem.

7. The combination with a fixture-supporting stem and a split fixture-supporting loop unit, of a connector between said unit and stem comprising a screw member having screw threads omitted from an intermediate portion thereof to reduce the time of coupling of the screw with said stem.

8. A fixture support and canopy holder comprising a stem, a screw member adjustably engaged therein, a metal sleeve engaged on said screw member, a beaded insulation collar engaged around said sleeve and affording a support for a fixture canopy, a split fixture-supporting unit, a connecting nipple engaged therethrough and secured in said metal sleeve to rotatably hold the fixture-supporting unit in position, and means for locking the split fixture-supporting unit against rotation.

9. A fixture support and canopy holding device comprising a canopy and fixture-supporting unit, a stem internally threaded at one end, and a screw connector adjustably connecting said stem with said fixture support and canopy holding unit and comprising threaded end sections integrally connected by an intermediate plain section to permit the plain intermediate section of the screw member to be slidably pushed upwardly into telescoping engagement with the stem after one end section has been screwed through the internally threaded portion of the stem to permit the second threaded section of the screw member to be engaged and threaded into the threaded end of said stem to facilitate mounting of the fixture and canopy supported by the fixture support and canopy holder connected with the screw member.

10. A fixture support and canopy holding device comprising a pair of axially interfitting stem members, a canopy holder secured on one of said stem members, an insulation member on said canopy holder affording a seat for a canopy which is to be supported in position, a split fixture-supporting unit, means for connecting the same with said canopy holder to normally permit the split fixture supporting unit to be rotated with respect to said holder and said supporting means, and a locking device adapted to be bent to engage in said means and in said split unit for locking the split fixture-supporting unit against rotation with respect to the canopy holder and the supporting means.

11. A fixture-supporting and canopy holding device comprising an adjustable telescopic stem, a beaded canopy holder rigidly secured thereto and adapted to afford a seat for a fixture canopy, a slotted fixture-supporting unit, means for connecting the same to said canopy holder, and a locking member having parts adapted to be projected into the slot of said slotted fixture-supporting unit and into said means to hold said fixture-supporting unit against rotation with respect to said canopy holder.

12. A fixture-supporting and canopy holding device comprising an insulation canopy holder adapted to be connected to a fixture stem, a split fixture-supporting unit, a lock ring engaged thereon, a slotted nipple for rotatably supporting the split fixture-supporting unit on said canopy holder, and a lock member on said nipple adapted to have portions thereof bent to engage in the slotted fixture-supporting unit and in the slot provided in said nipple to hold the fixture-supporting unit locked against rotation with respect to the nipple and with respect to the canopy holder.

13. A fixture-supporting and canopy holding device comprising a canopy holder, a split fixture-supporting unit, a lock ring engaged thereon, a slotted coupling supporting said split fixture-supporting unit and removably connecting the same with said canopy holder, and a locking member engaged on said coupling and having projections integrally formed thereon adapted to project into the slot of said slotted fixture-supporting unit and into the slot of said coupling to hold the split fixture-supporting unit locked against rotation with respect to the coupling and with respect to the canopy holder.

In testimony whereof I have hereunto subscribed my name at Chicago, Cook County, Illinois.

JOHN B. GLOWACKI.